United States Patent
Mueller

(10) Patent No.: US 10,122,835 B2
(45) Date of Patent: Nov. 6, 2018

(54) METHOD AND RADIO COMMUNICATION SYSTEM FOR AN INDUSTRIAL AUTOMATION SYSTEM, RADIO SUBSCRIBER STATION AND SERIALIZATION UNIT

(71) Applicant: Siemens Aktiengesellschaft, Munich (DE)

(72) Inventor: Joerg Mueller, Linkenheim (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 15/849,164

(22) Filed: Dec. 20, 2017

(65) Prior Publication Data
US 2018/0191876 A1    Jul. 5, 2018

(30) Foreign Application Priority Data
Dec. 29, 2016   (EP) .................................. 16207274

(51) Int. Cl.
*H04W 4/00*     (2018.01)
*H04L 12/66*    (2006.01)
(Continued)

(52) U.S. Cl.
CPC ............ *H04L 69/324* (2013.01); *H04L 49/70* (2013.01); *H04L 12/4641* (2013.01); *H04L 61/6022* (2013.01); *H04W 88/08* (2013.01)

(58) Field of Classification Search
CPC ........... H04L 41/0668; H04L 12/40176; H04L 12/4641; H04L 45/24
See application file for complete search history.

(56) References Cited

U.S. PATENT DOCUMENTS

| | | | |
|---|---|---|---|
| 9,936,004 B2 * | 4/2018 | Cachin | .................... H04L 67/10 |
| 2008/0304480 A1 * | 12/2008 | Langguth | ................ H04L 45/02 370/389 |

(Continued)

FOREIGN PATENT DOCUMENTS

| | | |
|---|---|---|
| EP | 2712124 | 3/2014 |
| EP | 3035606 | 6/2016 |
| WO | WO2010/057655 | 5/2010 |

OTHER PUBLICATIONS

Markus Rentschler et al., "The parallel Redundancy Protocol for Industrial IP Networks", Feb. 25, 2013 Industrial Technology (ICIT), 2013 IEEE International Conference on, IEEE, pp. 1404-1409.

*Primary Examiner* — Melanie Jagannathan
(74) *Attorney, Agent, or Firm* — Cozen O'Connor

(57) ABSTRACT

A radio communication system in which first and second communication devices are linked redundantly to an industrial communication network, wherein the first communication device is connected to a serialization unit connected to a network infrastructure device, first and second radio base stations are connected to the network infrastructure device, the second communication device is indirectly or directly connected to a first and a second radio subscriber station, the first radio subscriber station is connected to the first radio base station whilst the second radio subscriber station is connected to the second radio base station, where the serialization unit replaces destination addresses in data frames conveyed by the first communication device with addresses of the first or second radio subscriber stations, where the radio subscriber stations replace destination addresses corresponding to their address in data frames conveyed via the radio base stations with original destination addresses replaced in the serialization unit.

19 Claims, 3 Drawing Sheets

(51) Int. Cl.
*H04L 29/08* (2006.01)
*H04L 12/931* (2013.01)
*H04L 29/12* (2006.01)
*H04L 12/46* (2006.01)
*H04W 88/08* (2009.01)

(56) References Cited

U.S. PATENT DOCUMENTS

| | | | | |
|---|---|---|---|---|
| 2011/0029687 A1* | 2/2011 | Kirrmann | ............ | H04L 12/437 |
| | | | | 709/236 |
| 2013/0223204 A1* | 8/2013 | Angst | ................ | H04L 41/0668 |
| | | | | 370/218 |
| 2013/0286820 A1* | 10/2013 | Angst | .................... | H04L 47/32 |
| | | | | 370/225 |
| 2015/0049639 A1* | 2/2015 | Angst | ................ | H04L 12/4641 |
| | | | | 370/254 |
| 2015/0295635 A1* | 10/2015 | Koskiande | ......... | H04L 12/2863 |
| | | | | 370/315 |
| 2017/0264560 A1* | 9/2017 | Heine | .................... | H04L 47/32 |

* cited by examiner

METHOD AND RADIO COMMUNICATION SYSTEM FOR AN INDUSTRIAL AUTOMATION SYSTEM, RADIO SUBSCRIBER STATION AND SERIALIZATION UNIT

BACKGROUND OF THE INVENTION

1. Field of the Invention

The invention relates to industrial automation systems and, more particularly to a radio communication system for an industrial automation system, a method for operating the radio communication system, a radio subscriber station and a serialization unit,

2. Description of the Related Art

Industrial automation systems serve for monitoring, controlling and regulating technical processes, particularly in the field of production, process and building automation, and provide for an operation of control facilities, sensors, machines and industrial plants which should occur as autonomously and independently of human interventions as possible. Because of a constantly increasing significance of information technology for automation systems that comprise numerous networked control and computer units, methods for reliable provision of functions distributed over an automation system for a provision of monitoring, control and regulating functions are gaining increasing significance. Interruptions of communication links between computer units of an industrial automation system or automation devices can lead to an unwanted or unnecessary repetition of a transmission of a service request. A particular set of problems results in industrial automation systems being regularly taken out of a message traffic comprising relatively many but relatively short messages, as a result of which the above problems are amplified.

In order to compensate for failures of communication links or devices, communication protocols for a shock-free redundant transmission of messages in highly available industrial communication networks have been developed. This includes high-availability seamless redundancy (HSR) and Parallel Redundancy Orotocol (PRP) which are defined in the International Electrotechnical Commission (IEC) Standard 62439-3 and, in the case of network disturbances, provide for a changeover-shock-free transmission of messages with extremely short recovery times. According to the High-Availability Seamless Redundancy and Parallel Redundancy Protocol, each message is duplicated by a transmitting communication device and sent on two different paths to a receiver. Redundant messages representing duplicates are filtered out of a received data stream by a communication device at the receiver end.

In the IEC 62439-3 Standard, cable-connected transmission links have been prescribed exclusively hitherto for the Parallel Redundancy Protocol (PRP) due to relatively long latency runtimes in wireless communication systems and a resultant non-deterministic transmission characteristic. In "Towards a Reliable Parallel Redundant WLAN Black Channel", Markus Rentschler, Per Laukemann, Institute of Electrical and Electronics Engineers (IEEE), 2012, the suitability of WLAN transmission links in PRP communication networks is investigated. By parallel application of different diversity techniques for, space, time and frequency, for example, effects of stochastic channel fading can be sufficiently compensated for in WLAN communication networks.

EP 2 712 124 A1 discloses a redundantly operated industrial communication system comprising communication devices linked redundantly to an industrial communication network in which message transmission is cableless, at least in sections. In this industrial communication network, a plurality of buffer storage units are provided for message elements received at cable attached network node and to be sent by the latter cablelessly. When a maximum buffer size is exceeded, an oldest message element located in the respective buffer storage unit is deleted. Up to a transgression of the maximum buffer size, the oldest message element is selected as next message element to be sent cablelessly.

DE 10 2012 209509 A1 discloses a device for reliable data transmission between a mobile subscriber who has at least one transmission device, and a stationary receiver is described. In this context, the mobile subscriber can change between a plurality of radio cells. Each radio cell has at least one transmission device that is connected by wire to at least one network. The stationary receiver is also connected by wire to the at least one network. Both the wireless transmission between the mobile subscriber and each of its associated transmission device as well as the wired data transmission between the transmission device and the at least one associated network occur redundantly. The stationary receiver is redundant and connected by wire to the network.

European patent application 16157779.6 relates to a redundantly operable industrial communication system in which a first communication device via a first and second communication terminal is redundantly connected to a first switch. Correspondingly, a second communication device having redundancy function here is connected redundantly to a second switch via a first and second communication network terminal. Data frames conveyed from the first communication network terminal of the first and the second communication device to a respective switch are allocated to a first virtual local network, whilst data frames conveyed from the second communication network terminal of the first and the second communication device to the relevant switch are allocated to a second virtual local network. Data frames allocated to the first virtual local network are sent via a respective first radio transceiver station via a first radio network whilst data frames allocated to the second virtual local network are sent via a respective second radio transceiver station via a second radio network.

European patent application 16157795.2 discloses a radio communication system for an industrial automation system in which at least one first and at least one second communication device are linked redundantly to an industrial communication network. The first and second communication device are each connected via their first and via their second communication network terminal indirectly or directly to a respective first radio transceiver station and to a respective second radio transceiver station. The first and second radio transceiver stations determine a sequence for data frames to be sent within a predetermined time interval of destination MAC addresses allocated to the data frames to be sent. Within data frames to be sent to a selected destination MAC address the sequence is determined by its input order. In addition, the first and second radio transceiver stations coordinate their sequences for data frames to be sent such that both radio transceiver stations always send data frames to different destination MAC addresses.

In the case of VLAN-based methods for conveying PRP data frames via WLAN transceiver stations connected to a restricted VLAN-capable switch, a reliable forwarding of PRP data frames having identical source and destination address can be problematic within such a switch in spite of allocation to different VLANs. In many cases, such problems can be solved only by two completely separated part-networks. Even in the case of solutions with radio modules actuated via a common WLAN controller, it must always be ensured for VLAN-based methods for conveying PRP data frames that MAC addresses are not learned beyond VLAN.

SUMMARY OF THE INVENTION

It is an object of the present invention to provide a failure-proof radio communication system for an industrial automation system which can be integrated in a simple manner into existing communication networks and to provide an efficient radio resource utilization, and to provide a method for operating the radio communication system, as well as suitable system components.

This and other objects and advantages are achieved in accordance with the invention by a method and radio communication system comprising at least one first and one second communication device linked redundantly to an industrial communication network, each comprising at least one first and at least one second communication terminal and one signal processing unit connected to the first and second communication network terminal. The signal processing unit has a multiplexer unit for parallel forwarding of data frames to be sent to both communication network terminals and a redundancy treatment unit for processing data frames received by both communication network terminals. The redundancy treatment unit is configured to detect received redundant data frames. Also includes is at least one network infrastructure device having a plurality of communication network terminals and one coupling element connecting the communication network terminals to one another.

In accordance with the invention, the first communication device is connected via its first and via its second communication network terminal to a serialization unit that is connected to the network infrastructure device via exactly one line connection. A first and a second radio base station are connected to the network infrastructure device. The second communication device is connected via its first and via its second communication network terminal indirectly or directly to a first and a second radio subscriber station. The first radio subscriber station is connected to the first radio base station via a first radio link, whilst the second radio subscriber station is connected to the second radio base station via a second radio link. The radio subscriber stations and the radio base stations can be allocated, for example, to a wireless local area network, a WorldWide Interoperability for Microwave Access (WiMAX), a Universal Mobile Telecommunications System (UMTS), a Long Term Evolution (LTE) mobile radio network or another type of mobile radio network.

In accordance with the invention, the serialization unit is additionally configured to replace destination addresses in data frames conveyed via the first communication network terminal of the first communication device in each case with an address of the first radio subscriber station. In accordance with the invention, the serialization unit is further configured to replace destination addresses in data frames conveyed via the second communication network terminal of the first communication device in each case with an address of the second radio subscriber station. The first radio subscriber station is configured to replace destination addresses corresponding to its address in data frames conveyed via the first radio link in each case with original destination addresses replaced in the serialization unit. Correspondingly, the second radio subscriber station is configured to replace destination addresses corresponding to its address in data frames conveyed via the second radio link in each case with original destination addresses replaced in the serialization unit. In this way, the present invention enables PRP data frames to be conveyed via WLAN transmission links without requiring completely mutually independent real or virtual part-networks between the first and the second communication device for this purpose.

In accordance with a preferred embodiment of the present invention, the serialization unit is configured to insert replaced original destination addresses in data frames conveyed via the first and second communication network terminal of the first communication device as additional information into a predetermined area of the respective data frame. In addition, the first and second radio subscriber stations can be configured to replace destination addresses corresponding with their address in data frames conveyed via the first and second radio link in each case in accordance with the additional information in the predetermined area of the respective data frame with the original destination address. As a result, a particularly reliable replacement and restoration of the original destination addresses is provided. The first communication device, the second communication device, the network infrastructure device or the serialization unit, respectively, can be, for example, software-implemented or virtualized functional units of a computer-based device.

Preferably, mutually redundant data frames are identified by a uniform sequence number. In this context, the signal processing units of the first and the second communication device are configured for sequence numbers to be issued to data frames to be conveyed redundantly. In particular, a transmission of data frames to be conveyed redundantly can occur in accordance with the Parallel Redundancy Protocol. Here, the serialization unit is advantageously configured to insert replaced original destination addresses in data frames conveyed via the first and second communication network terminal of the first communication device as additional information in a PRP trailer of the respective data frame. Correspondingly, the first and the second radio subscriber stations can be configured to replace destination addresses corresponding to their address in data frames conveyed via the first and second radio link in each case in accordance with the additional information in the PRP trailer of the respective data frame with the original destination address. The first and second communication device can be, for example, a PRP red box. Via such a PRP red box, in each case at least one communication device which is simply connected can be connected to the industrial communication network.

In accordance with the method of the invention for operating a radio communication system for an industrial automation system, at least one first and one second communication device are linked redundantly to an industrial communication network. In this context, the first and the second communication device each have at least one first and at least one second communication network terminal and one signal processing unit connected to the first and second communication network terminal. The signal processing unit forwards data frames to be sent in parallel to both communication network terminals and detects redundant data frames received from both communication network terminals. Additionally, at least one network infrastructure device is provided with a plurality of communication network terminals and one coupling element connecting the communication network terminals to one another.

In accordance with the invention, the first communication device is connected via its first and second communication network terminals to a serialization unit that is connected to the network infrastructure device via exactly one line connection. A first and a second radio base station are connected to the network infrastructure device. The second communication device is connected via its first and second communication network terminals indirectly or directly to a first and a second radio subscriber station. The first radio subscriber station is connected to the first radio base station via a first radio link. Correspondingly, the second radio subscriber station is connected to the second radio base station via a second radio link. The serialization unit replaces destination addresses in data frames conveyed via the first communication network terminal of the first communication device in each case with an address of the first radio subscriber station. In addition, the serialization unit replaces destination addresses in data frames conveyed via the second communication network terminal of the first communication device in each case with an address of the second radio subscriber station. Correspondingly, the first radio subscriber station replaces destination addresses corresponding to its address in data frames conveyed via the first radio link in each case with original destination addresses replaced in the serialization unit. Analogously, the second radio subscriber station replaces destination addresses corresponding to its address in data frames conveyed via the second radio link in each case with original destination addresses replaced in the serialization unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be explained in greater detail in the text which follows in an exemplary embodiment by means of the drawing, in which.

DETAILED DESCRIPTION OF THE EXEMPLARY EMBODIMENTS

Figure 1:
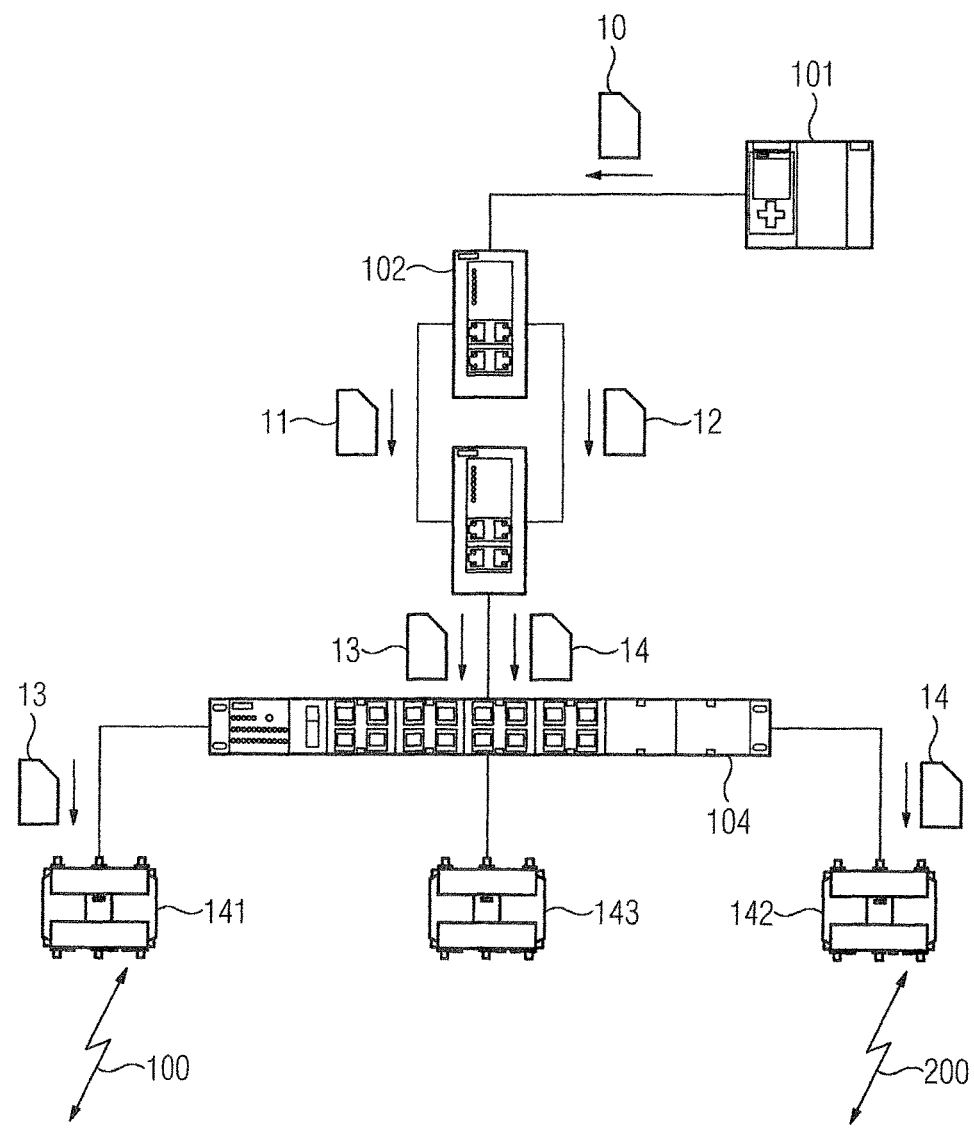
FIG. 1 shows a first part of a radio communication system for an industrial automation system with a first PRP Redbox, a switch and a number of WLAN base stations connected to the switch.

With reference to FIG. 1, the first part of the radio communication system for an industrial automation system comprises a first PRP Redbox 102, which has at least 3 communication network terminals. Data frames to be conveyed redundantly are transmitted in accordance with the Parallel Redundancy Protocol (PRP) in the present illustrative embodiment. The first PRP Redbox 102 is redundantly connected via a first and second communication terminal to a serialization unit 103. The serialization unit 103 is also connected to a switch 104 via exactly one line connection. The switch 104 comprises a plurality of communication network terminals and a coupling element interconnecting the communication network terminals to one another. Such a coupling element can be, for example, realized via of a high-speed bus or a backplane switch with associated controller.

A Supervisory Control and Data Acquisition (SCADA) system 101 is connected to an interlink port, which constitutes a third communication network terminal of the first PRP Redbox 102, at management system level in the present illustrative embodiment. In addition, the first part of the radio communication system comprises WLAN base stations 141, 142, 143, 144 connected to the switch 104. Instead of WLAN base stations, radio base stations for a WorldWide Interoperability for Microwave Access (WiMAX), a Universal Mobile Telecommunications System (UMTS), a Long Term Evolution (LTE) mobile radio network or another mobile radio network can also be used in principle. The following statements apply analogously to this.

Figure 2:
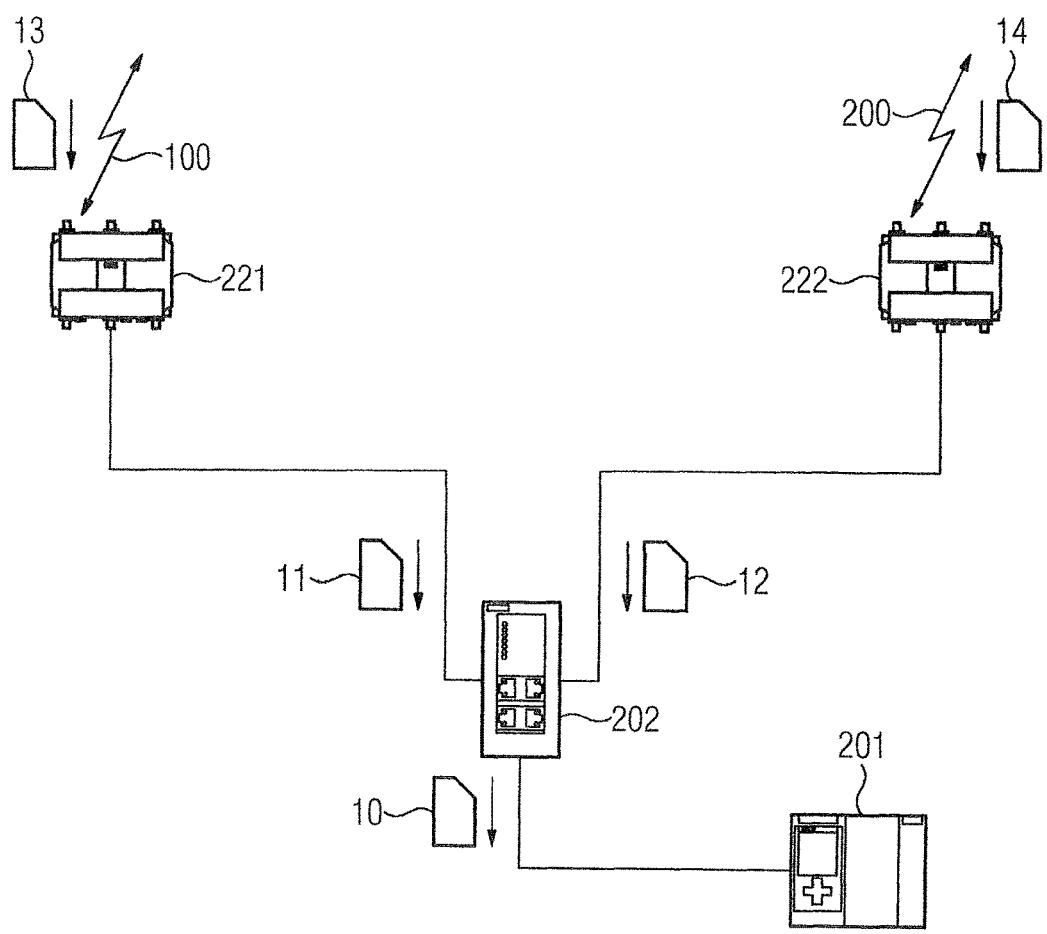
FIG. 2 shows a second part of the radio communication system with a second PRP Redbox and a number of WLAN subscriber stations connected to the second PRP Redbox.

In accordance with FIG. 2, the second part of the radio communication system comprises a second PRP Redbox 202 that also has at least 3 communication network terminals. The second PRP Redbox 202 is connected via each of its first and second communication network terminals to one WLAN subscriber station 221, 222. In the present illustrative embodiment, a sensor or actuator system 201 of an industrial automation system is connected at field level to an interlink port that represents a third communication network terminal of the second PRP Redbox 202. This sensor or actuator system 201 can be, for example, a production robot, a drive for a conveyor system, a control unit for a transportation system or an operating and observation station on a production line. A first WLAN subscriber station 221 is connected in the present illustrative embodiment to a first WLAN base station 141 via a first radio link 100 whilst a second WLAN subscriber station 222 is connected to a second WLAN base station 142 via a second radio link 200. For the first radio link 100, a first WLAN SSID is used whilst for the second radio link 200, a second WLAN SSID is used. The first WLAN SSID and the second WLAN SSID differ from one another.

The first PRP Redbox 102 and second PRP Redbox 202 each have a signal processing unit connected to their communication terminals, which comprises a multiplexer unit for parallel forwarding of data frames to be sent to the respective first and second communication network terminal. Data frames 10 sent by a communication or automation device 101 linked in a simple manner, such as the SCADA system 101, are duplicated by a multiplexer unit so that mutually redundant PRP data frames 11, 12 having an identical source and destination address are generated. Mutually redundant PRP data frames 11, 12 are identified by a uniform sequence number issued by the respective signal processing unit to PRP data frames 11, 12 to be conveyed redundantly. The mutually redundant PRP data frames 11, 12 are then forwarded from the respective PRP Redbox 102, 202 to the serialization unit 103 or to the WLAN subscriber station 221-222, respectively.

In addition, the first PRP Redbox 102 and second PRP Redbox 202 each have a redundancy treatment unit for processing data frames received by the respective first and second communication network terminal. The redundancy treatment unit is provided for detecting and filtering out received redundant data frames. Furthermore, a storage unit that stores the sequence numbers of data frames already received faultlessly is allocated to the respective signal processing unit in each case. Upon receiving a new data frame, the redundancy treatment unit performs a check for correspondence with a sequence number already stored.

The serialization unit 103 is configured to replace destination MAC addresses in PRP data frames 11 conveyed via a first communication network terminal of the first PRP Redbox 102 in each case with an MAC address of the first WLAN subscriber station 221 and to replace destination MAC addresses in PRP data frames 12 conveyed via a second communication network terminal of the first PRP Redbox 102 in each case with an MAC address of the second WLAN subscriber station 222. In this way, modified data frames 13, 14 are generated from the mutually redundant PRP data frames 11, 12 that differ with regard to their destination MAC addressees. Thus, the modified data frames 13, 14 can be forwarded in accordance with their destination MAC addresses without problems to the first WLAN base station 141 or to the second WLAN base station 142 in order to be sent from there to the first WLAN subscriber station 221 or to the second WLAN subscriber station 222, respectively. To modify the mutually redundant PRP data frames 11, 12, the serialization unit 103 inserts the replaced original destination MAC addresses as additional information into a PRP trailer of the respective modified data frame 13, 14.

The MAC addresses of the WLAN subscriber stations 221, 222 are learned by the serialization unit 103 as part of setting up the first radio link 100 or the second radio link 200, respectively. Firstly, the MAC addresses of the WLAN subscriber stations 221, 222 are stored in a Source Address Table (SAT) allocated to the respective WLAN base station 141, 142. Subsequently, the MAC addresses of the WLAN subscriber stations 221, 222 can, for example, be read out of the respective Source Address Table by the serialization unit 103, or the WLAN base stations 141, 142 convey corresponding information about connected WLAN subscriber stations to the serialization unit 103.

Corresponding to the serialization unit 103, the first WLAN subscriber station 221 is configured to replace destination MAC addresses corresponding with its MAC address in modified data frames 13 conveyed via the first radio link 100 in each case with original destination MAC addresses replaced in the serialization unit 103. Analogously to this, the second WLAN subscriber station 222 is configured to replace destination-MAC addresses corresponding to its MAC address in modified data frames 14 conveyed via the second radio link 200 in each case with original destination MAC addresses replaced in the serialization unit 103. In this context, the first WLAN subscriber station 221 and the second WLAN subscriber station 222 replace destination-MAC addresses corresponding to their address in each case in accordance with the additional information in the PRP trailer of the respective modified data frame 13, 14. In this way, the original PRP data frames 11, 12 are reconstructed. The reconstructed PRP data frames 11, 12 can subsequently be conveyed to the second PRP Redbox 202 for duplicate filtering.

In a conveyance of redundant PRP data frames from the second PRP Redbox 202 via the two radio links 100, 200 to the first PRP Redbox 102, source MAC addresses are exchanged instead of the destination MAC addresses via the WLAN subscriber stations 221, 222 and via the serialization unit 103. Thus the WLAN subscriber stations 221, 222 replace source MAC addresses in PRP data frames received from the second PRP Redbox 202 in each case with their own MAC address. In this way, modified data frames are generated from the mutually redundant PRP data frames, which differ with regard to their source MAC addresses. Thus, address information items stored in above source address tables remain consistent for the conveyance of the PRP data frames 11, 12 from the first PRP Redbox 102 to the second PRP Redbox 202.

For the modification of mutually redundant PRP data frames, the WLAN subscriber stations 221, 222 insert the replaced original source MAC addresses as additional information into a PRP trailer of the respective modified data frame. Correspondingly, the serialization unit 103 replaces the source MAC addresses corresponding to the MAC addresses of the WLAN subscriber stations 221, 222 in modified data frames conveyed via the switch 104 in accordance with the additional information in the PRP trailers in each case with the original source MAC addresses.

For better clarity and for simpler understanding, the PRP Redboxes 102, 202, the serialization unit 103, and the switch 104 are each represented as separate units in the present illustrative embodiment. In principle, the PRP Redboxes 102, 202, the serialization unit 103 and the switch 104 can also be software-implemented or virtualized functional units of a computer-based device and, for example, run as entities on a computer having a processor and memory. This applies particularly for a combination of the first PRP Redbox 102, the serialization unit 103 and the switch 104 in a common computer unit.

If the second PRP Redbox 202, analogously to the first PRP Redbox 102, is also connected to the WLAN subscriber stations 221, 222 via a switch, then the second PRP Redbox 202 is also connected to this switch via a serialization unit. In addition, both the destination MAC addresses and the source MAC addresses should have been replaced by the serialization units in redundant data frames to be conveyed via the radio links 100, 200. This ensures that data frames received in the switches via the radio links 100, 200 at different ports always have different source MAC addresses, especially after a reconstruction of original destination MAC addresses by the WLAN subscriber stations 221, 222 or by the WLAN base stations 141, 142. When using a common WLAN controller for the WLAN subscriber stations 221, 222, both the destination MAC addresses and the source MAC addresses should also have been replaced by serialization units.

Figure 3:
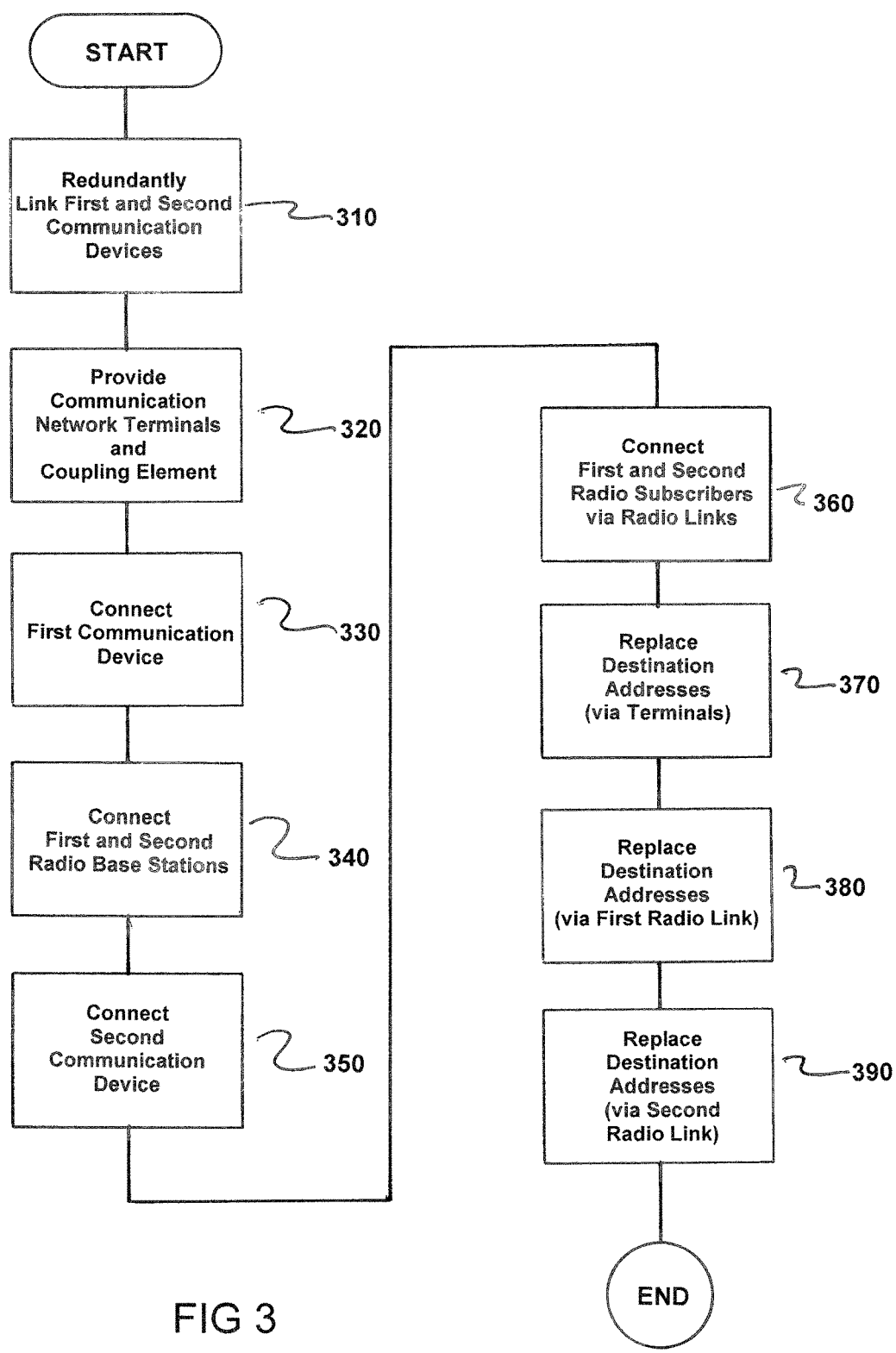
FIG. 3 is a flowchart of the method in accordance with the invention.

FIG. 3 is a flowchart of the method for operating a radio communication system for an industrial automation system. The method comprises linking at least one first and second communication devices redundantly to an industrial communication network, as indicated in step 310. In accordance with the method of the invention, the at least one first and second communication devices each comprise at least one first and one second communication network terminal, and a signal processing unit connected to the at least one first and second communication network terminal, where the signal processing unit forwarding data frames to be sent in parallel to the at least one first and second communication network terminals and detecting redundant data frames received by the at least one first and second communication network terminals.

Next, at least one network infrastructure device is provided with a plurality of communication network terminals and a coupling element interconnecting the communication network terminals, as indicated in step 320.

Next, connecting the first communication device is connected via its at least one first and second communication network terminals to a serialization unit which is connected to the network infrastructure device via exactly one line connection, as indicated in step 330.

A first and a second radio base station are now connected to the network infrastructure device, as indicated in step 340. Next, the at least one second communication device is connected via its at least one first and second communication network terminals either (i) indirectly and/or (ii) directly to a first and a second radio subscriber station, as indicated in step 350.

The first radio subscriber station is connected to the first radio base station via a first radio link and the second radio subscriber station is connected to the second radio base station via a second radio link, as indicated in step 360.

Next, destination addresses in each data frame conveyed via the at least one first communication network terminal of the first communication device are replaced by the serialization unit with an address of the first radio subscriber station, and destination addresses in data frames conveyed via the at least one second communication network terminal of the at least one first communication device are replaced with an address of the second radio subscriber station, as indicated in step 370.

Next, destination addresses corresponding to its address in each data frame conveyed via the first radio link with original destination addresses are now replaced in the serialization unit replacing by the first radio subscriber station, as indicated in step 380.

Destination addresses corresponding to its address in each data frame conveyed via the second radio link are now replaced by the first radio subscriber station with the original destination addresses replaced in the serialization unit, as indicated in step 390.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A radio communication system for an industrial automation system, comprising:
    at least one first and one second communication device operatively linked redundantly to an industrial communication network, each of the at least one first and one second communication device comprising:
        at least one first and one second communication network terminal, and
        a signal processing unit connected to the at least one first and second communication network terminals, said signal processing unit having a multiplexer unit for parallel forwarding of data frames to be sent to the at least one first and second communication network terminals and having a redundancy treatment unit for processing data frames received by the at least one first and second communication network terminals, the redundancy treatment unit being configured to detect received redundant data frames;
    at least one network infrastructure device comprising:
        a plurality of communication network terminals, and
        a coupling element interconnecting the at least one first and second communication network terminals;
    wherein the at least one first communication device is connected via its at least one first and second communication network terminals to a serialization unit which is connected to the least one network infrastructure device via exactly one line connection;
    wherein a first and a second radio base station are connected to the at least one network infrastructure device;
    wherein the at least one second communication device is connected via its at least one first and second communication network terminals one of (i) indirectly and (ii) directly to a first and a second radio subscriber station;
    wherein the first radio subscriber station is connected to the first radio base station via a first radio link and the second radio subscriber station is connected to the second radio base station via a second radio link;
    wherein the serialization unit is configured to replace destination addresses in each data frame conveyed via the at least one first communication network terminal of the at least one first communication device with an address of the first radio subscriber station and configured to replace destination addresses in each data frame conveyed via the at least one second communication network terminal of the at least one first communication device with an address of the second radio subscriber station;
    wherein the first radio subscriber station is configured to replace destination addresses corresponding to its address in each data frame conveyed via the first radio link with original destination addresses replaced in the serialization unit; and
    wherein the second radio subscriber station is configured to replace destination addresses corresponding to its address in each data frame conveyed via the second radio link with the original destination addresses replaced in the serialization unit.

2. The communication system as claimed in claim 1, wherein the serialization unit is further configured to insert the replaced original destination addresses in data frames conveyed via the at least one first and second communication network terminals of the at least one first communication device as additional information into a predetermined area of a respective data frame.

3. The communication system as claimed in claim 2, wherein the first and the second radio subscriber stations are configured to replace destination addresses corresponding to their address in each data frame conveyed via the at least one first and second radio link in accordance with the additional information in the predetermined area of the respective data frame with the original destination address.

4. The communication system as claimed in claim 1, wherein mutually redundant data frames are identified by a uniform sequence number; and wherein signal processing units of the at least one first and second communication devices are configured to sequence numbers to be issued to data frames to be conveyed redundantly.

5. The communication system as claimed in claim 2, wherein mutually redundant data frames are identified by a uniform sequence number; and wherein signal processing units of the at least one first and second communication devices are configured to sequence numbers to be issued to data frames to be conveyed redundantly.

6. The communication system as claimed in claim 3, wherein mutually redundant data frames are identified by a uniform sequence number; and wherein signal processing units of the at least one first and second communication devices are configured to sequence numbers to be issued to data frames to be conveyed redundantly.

7. The communication system as claimed in claim 4, wherein a transmission of data frames to be conveyed redundantly occurs in accordance with the Parallel Redundancy Protocol (PRP).

8. The communication system as claimed in claim 7, wherein the serialization unit is configured to insert replaced original destination addresses in data frames conveyed via the first and second communication network terminal of the first communication device as additional information into a PRP trailer of the respective data frame.

9. The communication system as claimed in claim 8, wherein the first and the second radio subscriber stations are configured to replace destination addresses corresponding to their address in each data frame conveyed via the first and second radio link in accordance with the additional information in the PRP trailer of the respective data frame with the original destination address.

10. The communication system as claimed in claim 7, wherein the at least one first and second communication devices comprise a PRP Redbox, and wherein in each case a communication device is connected to the industrial communication network.

11. The communication system as claimed in claim 1, wherein the first and second radio subscriber stations and the first and second radio base stations are allocated to one of (i) at least one Wireless Local Area Network, (ii) a Worldwide Interoperability for Microwave Access (WiMAX), (iii) a Universal Mobile Telecommunications System (UMTS) and (iv) a Long-Term Evolution (LTE) mobile radio network and another mobile radio network.

12. The communication system as claimed in claim 1, wherein at least one of (i) the at least one first communication device, (ii) the at least one second communication device, (iii) the network infrastructure device and (iv) the serialization unit are at least one of (i) software-implemented and (ii) virtualized functional units of a computer-based device.

13. A method for operating a radio communication system for an industrial automation system, comprising:
  linking at least one first and second communication devices redundantly to an industrial communication network, the at least one first and second communication devices each comprising:
    at least one first and one second communication network terminal, and
    a signal processing unit connected to the at least one first and second communication network terminal, said signal processing unit forwarding data frames to be sent in parallel to the at least one first and second communication network terminals and detecting redundant data frames received by the at least one first and second communication network terminals;
  providing at least one network infrastructure device with a plurality of communication network terminals and a coupling element interconnecting the communication network terminals;
  connecting the first communication device via its at least one first and second communication network terminals to a serialization unit which is connected to the network infrastructure device via exactly one line connection;
  connecting a first and a second radio base station to the network infrastructure device;
  connecting the at least one second communication device via its at least one first and second communication network terminals one of (i) indirectly and (ii) directly to a first and a second radio subscriber station;
  connecting the first radio subscriber station to the first radio base station via a first radio link and connecting the second radio subscriber station to the second radio base station via a second radio link;
  replacing, by the serialization unit, destination addresses in each data frame conveyed via the at least one first communication network terminal of the first communication device with an address of the first radio subscriber station and replacing, by the serialization unit, destination addresses in data frames conveyed via the at least one second communication network terminal of the at least one first communication device with an address of the second radio subscriber station;
  replacing, by the first radio subscriber station, destination addresses corresponding to its address in each data frame conveyed via the first radio link with original destination addresses replaced in the serialization unit; and
  replacing, by the second radio subscriber station, destination addresses corresponding to its address in each data frame conveyed via the second radio link with the original destination addresses replaced in the serialization unit.

14. The method as claimed in claim 13, wherein the serialization unit inserts replaced original destination addresses in data frames conveyed via the first and second communication network terminal of the first communication device as additional information into a predetermined area of a respective data frame.

15. The method as claimed in claim 14, wherein the first and second radio subscriber stations replace destination addresses corresponding to their address in each data frame conveyed via the first and second radio link in accordance with the additional information in the predetermined area of the respective data frame with the original destination address.

16. The method as claimed in claim 15, wherein mutually redundant data frames are identified by a uniform sequence number; and wherein the signal processing units of the at least one first and second communication devices issue sequence numbers to data frames to be conveyed redundantly.

17. The method as claimed in claim 16, wherein the data frames to be conveyed redundantly are transmitted in accordance with the Parallel Redundancy Protocol (PRP).

18. The method as claimed in claim 17, wherein the serialization unit inserts replaced original destination addresses in data frames conveyed via the at least one first and second communication network terminals of the first communication device as additional information into a PRP trailer of the respective data frame.

19. The method as claimed in claim 18, wherein the first and the second radio subscriber stations replace destination addresses corresponding to their address in each data frame conveyed via the first and second radio link in accordance with the additional information in the PRP trailer of the respective data frame with the original destination address.

* * * * *